United States Patent [19]

Strobel

[11] Patent Number: 4,569,853

[45] Date of Patent: * Feb. 11, 1986

[54] GRAPEFRUIT JUICE CONCENTRATE

[75] Inventor: Rudolf G. Strobel, Cincinnati, Ohio

[73] Assignee: The Procter & Gamble Company, Cincinnati, Ohio

[*] Notice: The portion of the term of this patent subsequent to Jul. 31, 2001 has been disclaimed.

[21] Appl. No.: 635,858

[22] Filed: Jul. 30, 1984

Related U.S. Application Data

[63] Continuation-in-part of Ser. No. 283,762, Jul. 16, 1981, Pat. No. 4,463,025, which is a continuation-in-part of Ser. No. 171,056, Jul. 22, 1980, abandoned.

[51] Int. Cl.$^4$ ............................ A23L 2/12; A23L 2/14
[52] U.S. Cl. .................................. 426/599; 426/384; 426/495
[58] Field of Search ............... 426/384, 385, 599, 521, 426/492, 495

[56] References Cited

U.S. PATENT DOCUMENTS

| | | | |
|---|---|---|---|
| Re. 24,466 | 4/1958 | Toulmin | 99/205 |
| 2,187,572 | 1/1940 | Meinzer | 426/384 |
| 2,292,460 | 8/1942 | McKinnis | 426/599 |
| 2,354,633 | 7/1944 | Bedford | 99/205 |
| 2,552,523 | 5/1951 | Cunningham | 62/124 |
| 2,552,525 | 5/1951 | Wenzelberger | 62/124 |
| 2,588,337 | 3/1952 | Sperti | 99/205 |
| 2,599,204 | 7/1951 | Wenzelberger | 62/170 |
| 2,735,779 | 2/1956 | Wenzelberger | 62/170 |
| 2,815,288 | 12/1957 | McKay | 99/205 |
| 3,140,187 | 7/1964 | Brent | 99/205 |
| 3,156,571 | 11/1955 | Walker | 99/205 |
| 3,205,078 | 9/1965 | Lund | 99/205 |
| 3,777,892 | 12/1973 | Thijssen | 210/178 |
| 3,872,009 | 3/1975 | Thijssen | 210/178 |
| 4,004,886 | 1/1977 | Thijssen et al. | 23/273 |
| 4,314,455 | 2/1982 | Engdahl | 62/124 |
| 4,374,865 | 2/1983 | Strobel | 426/599 |
| 4,463,025 | 7/1984 | Strobel | 426/599 |

FOREIGN PATENT DOCUMENTS 0541120  5/1957  Canada ................. 426/599

OTHER PUBLICATIONS van Pelt, W. H. J. M.; Ch. 33, "Freeze Concentration of Vegetable Juices", pp. 549–564 (1973).
van Pelt, W. H. J. M.; "Preparation of Aromas by the Freeze Concentration Process", (1978).
Thijssen et al., "Analysis and Economic Evaluation of Concentration Alternatives for Liquid Foods", (1978).
Braverman, J. B. S., *Citrus Products*, Interscience Publishers, Inc., N.Y. 1949, pp. 284–286.
*Food Engineering*, 27, 70 (1955).
Schreier et al., *Chem. Microbio. Technol. Lebensm.*, 6, 78–83, (1979).
Swinkels, "Concentration of Fruit Juices Prior to Drying", Talk Given at Instantisieren IV, (May 1980).
van Pelt, W. H. J. M., "Dutch Process Cuts Costs of Freeze Concentration", *Food Engineering*, 1975.
Goldblith et al., *Freeze Drying and Advanced Food Technology*, Academic Press, NY 1975; pp. 121, 122, 134–139, 316, 481 and 482.

(List continued on next page.)

*Primary Examiner*—Raymond Jones
*Assistant Examiner*—Elizabeth C. Weimar
*Attorney, Agent, or Firm*—Edmund F. Gebhardt; Rose Ann Dabek; Richard C. Witte

[57] ABSTRACT

A natural grapefruit juice concentrate prepared from natural grapefruit ingredients is disclosed. The concentrate has at least 35% solids including pulp, non-volatile compounds, pectin and volatile compounds. The concentrate has at least 65% of the aroma and flavor volatile compounds of the natural juice. The concentrate is prepared by separating natural grapefruit juice into a particulate solids portion (such as pectin or pulp) and a serum portion. The serum portion, which comprises 7 to 20% solids and from 80 to 93% water, is concentrated by removing essentially pure water. The concentration step can be accomplished by freeze concentration or by sublimation concentration. When sublimation concentration is used, the particulate solids do not have to be separated from the serum. Substantially 100% of the non-volatile solids are retained, and the concentrate is substantially free of oxidative degradation products.

10 Claims, 5 Drawing Figures

OTHER PUBLICATIONS

Desrosier, Norman W., *Elements of Food Technology*, AVI Publishing Co., Inc.; Westport, Conn. 1978, pp. 265, 270 and 271.

Cruess, W. V.; *Commercial Fruit and Vegetable Products*, 3rd Ed., McGraw-Hill Book Co., Inc., NY 1948, pp. 350, 351, 364 and 365.

Durr et al., "Freeze Concentration of Apple Juice and Apple Juice Aroma by the Grenco Process", *Alimenta*, 14, pp. 107–133 (1975).

van Pelt, W. H. J. M.; "Freeze Concentration of Vegetable Juice and Infusion", ASIC Colloquium in Brazil (1974).

Ahmed et al., *Agri. Food Chemistry*, "Effect of Selected Oil and Essence Volatile Components or Flavor Quality of Pump-Out Orange Juice", vol. 26, No. 2, 1978, pp. 368–372.

GRAPEFRUIT JUICE CONCENTRATE

CROSS REFERENCE TO RELATED APPLICATIONS

This is a continuation-in-part of U.S. application Ser. No. 283,762, filed July 16, 1981, now U.S. Pat. No. 4,463,025, issued July 31, 1984, to Strobel, which is a continuation-in-part of U.S. application Ser. No. 171,056, filed July 22, 1980, now abandoned.

BACKGROUND OF THE INVENTION

Grapefruit, like most citrus fruits and vegetables, have specific growing seasons. They grow only under certain climatic conditions, i.e., tropical and subtropical, such as occur in regions of Florida, Arizona, California, Texas, Brazil, Spain, Italy, Israel and Egypt, and are available in fresh form for only a portion of the year. In order to have grapefruit juice in good quality available year round, the grapefruit juice must be processed for storage and distribution. Since most citrus juices contain about 80 to 90% water, the most economical way to store and distribute the juice is in the form of a concentrate. The bulk of citrus juice commercially processed in the United States since 1950 has been as frozen concentrate.

The difficulty of producing a unique citrus juice concentrate having superior quality can be appreciated when one considers that citrus juice concentrates and other juice concentrates have been available for several decades, and that natural citrus juice products are enjoyed by a large proportion of the general public. Thus, in order to find broad acceptance, a new grapefruit juice concentrate product must overcome the acquired taste preferences of a large segment of the orange juice-consuming public.

In this discussion, references are made to aroma and flavor ingredients present in the juice and juice concentrates. It is known that organoleptic attributes of any commercial beverage are important to consumer acceptance; however, such attributes are uniquely involved in citrus fruit juice acceptability. The term "organoleptic" is defined as "effecting or employing one or more of the organs of special sense", i.e., taste, smell, etc. The challenge of producing a citrus juice product which is acceptable to a broad range of consumers involves making a unique product having acceptable flavor, i.e., taste; distinctive aroma, i.e., smell; acceptable appearance, i.e., sight; and satisfactory mouthfeel, i.e., touch. The aroma and flavor ingredients in any citrus fruit affect each of these organoleptic properties. This is surprising because although there are many ingredients which comprise citrus juice, the aroma and flavor ingredients are present in relatively small amounts.

An important objective achieved by the present invention is that a natural grapefruit juice product is prepared, and a process for its production is provided, which is uniquely different from previously known grapefruit juice products and processes. It is surprising that the grapefruit juice concentrate of this invention, when reconstituted, is close to freshly squeezed grapefruit juice, both in taste and stability. These and other benefits are achieved because the product and processes described herein offer unexpected improvements in virtually all of the organoleptic characteristics mentioned above. These unexpected improvements and advantages are described and illustrated hereinafter.

Most commercial concentration processes use evaporation techniques to remove much of the water from the juice. However, it is widely recognized that evaporation techniques result in the undesirable removal and loss of volatile aroma and flavor compounds along with water, thereby causing a significant deterioration in quality and overall aroma and flavor of the concentrated juice. Because evaporation processes involve heating the juice under conditions which permit oxidation of compounds in the juice, the aroma and flavor compounds in the juice can be chemically altered. For example, lipids can be oxidized, and amino acids and sugars can undergo browning reactions. The degradation products formed can cause off-flavors in the resulting juice concentrates.

Numerous methods have been devised to compensate for the loss of aroma and flavor during evaporation concentration processes. For instance, U.S. Pat. No. 3,140,187, issued to Brent (1964) discloses a method of minimizing the overall loss of aroma and flavor compounds by collecting "essence" of the juice. Essence is the term applied to the first 15% to 20% of the water removed through evaporation, which contains a significant amount of volatile aroma and flavor compounds. The essence is condensed, and the aroma and flavor compounds are recovered and added back to concentrated juice. However, this procedure is not totally satisfactory because only a fraction of the escaping aroma and flavor volatile compounds can be collected and recovered. Thus, there is necessarily a net loss in overall aroma and flavor of the final concentrated product.

Freeze concentration provides an alternative to evaporative concentration. In freeze concentration the objective is to remove water in the form of ice crystals.

U.S. Pat. No. 2,187,572, issued to Meinzer (1940) describes an orange juice concentrate which was prepared by extracting juice, centrifuging the juice to recover a pulp portion and provide a liquid centrifugate, freeze concentrating the centrifugate, and adding back the pulp portion to the concentrated juice. Meinzer suggests that the resulting juice product when reconstituted with water approaches the taste of the starting juice. Specific concentrations of volatile aroma and flavor compounds, and the identification of the key compounds retained within his product are not described.

Schreier et al., *Chem. Microbiol. Technol. Lebensm*, 6, 78–83 (1979) analyzed the behavior of volatile aroma compounds during freeze concentration of orange juice. During the course of freeze concentration the aroma and flavor compounds were analyzed by gas chromatography and quantitatively determined in the successive juice concentrates as well as in the successively separated ice. Significant amounts of aroma and flavor compounds were found to be removed in separated ice. Average loss of aroma and flavor compounds in the ice during each successive concentration was estimated to be around 12%. It is also evident that a loss of overall quality occurred because a number of oxidation products were formed during this freeze concentration process, such as nootkatone, carvone, geraniol, and alphaterpineol. The formation of these oxidation products and similar compounds can result in a juice product having a notable off-flavor.

Although Schreier employed a freeze concentration process, his analytical data reveal significant losses of volatile compounds. Moreover, because of the open processing used by both Meinzer and Schreier et al., oxidation products were produced. Ideally, freeze concentration removes only pure ice without removing any of the aroma and flavor compounds present in the original juice. If the recovered ice contains occluded aroma and flavor compounds, an inferior quality juice concentrate results.

A generalized procedure for producing a grapefruit juice concentrate involves first extracting the juice from the grapefruit and separating the juice from the rag and seed material. The juice can be separated into a pulp portion and a serum portion. The pulp may be further treated to separate the useful pulp from any small seeds and, if desired, to alter the quantity and size of the pulp. Eventually the pulp is recombined with processed serum.

The serum is concentrated by removing water to produce a concentrated serum. Some serum concentration processes are done in the presence of pulp. Typically, a last step may involve blending the concentrate with a desired amount of pulp to produce a final concentrated product which can be packaged and distributed.

The serum, which remains after pulp, rag, and seed are separated, is known to contain essentially water and the compounds which are responsible for the distinct grapefruit aroma and flavor. As a matter of fact, however, it is probably not possible to categorically assign one specific function to any given ingredient. For instance, a chemical compound which contributes to grapefruit aroma may also contribute to grapefruit flavor.

A grapefruit juice concentrate which can be a pasteurized product and which has substantially 100% of the non-volatile compounds originally present in the serum and at least 65% of the aroma and flavor volatile compounds is very desirable. Moreover, if the concentrate were prepared by a process which did not cause oxidative degradation of the solids in the juice, the resulting concentrate would, when diluted, taste as good as, or better than, the original juice.

It is an object of the present invention to provide a grapefruit juice concentrate having at least 35% solids. The solids comprise pulp, non-volatile compounds and at least 65% of the aroma and flavor volatile compounds which were present in the starting grapefruit juice. It is believed that such a concentrated grapefruit juice product has never been made before this invention. The retained volatile and non-volatile compounds are the very compounds which contribute importantly to the pleasant flavor and aroma of grapefruit juice.

An important contributor to the fruity character of citrus juice aroma and flavor is ethyl butyrate. At least about 0.1%, and preferably at least 0.15% of the aroma and flavor volatile equilibrated headspace compounds measured as gas chromatographic integrator counts, present in the grapefruit juice concentrate of this invention is ethyl butyrate. A second important volatile compound, limonene, is also retained in significant amounts.

It is a further object of this invention to produce a grapefruit juice concentrate which, when reconstituted, tastes as good as and as fresh as freshly squeezed grapefruit juice.

It is still another object of this invention to produce a citrus juice concentrate which can be used as a flavorant in beverages, including carbonated beverages, dry mixes and alcoholic beverages, candies, baked goods, and culinary mixes.

These and other objects of this invention will become apparent by the description of the invention below.

All percentages herein are by weight unless otherwise indicated.

SUMMARY OF THE INVENTION

Figure 1:
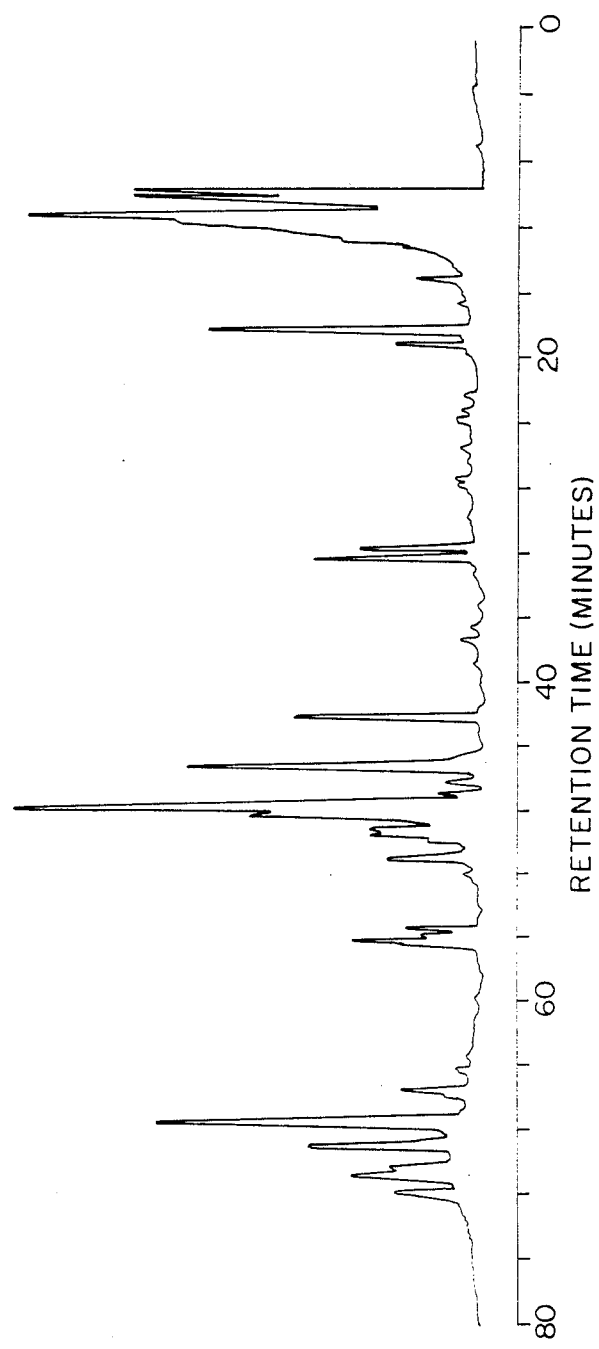
FIGS. 1 through 4 are gas chromatograms of grapefruit concentrates.
Figure 2:
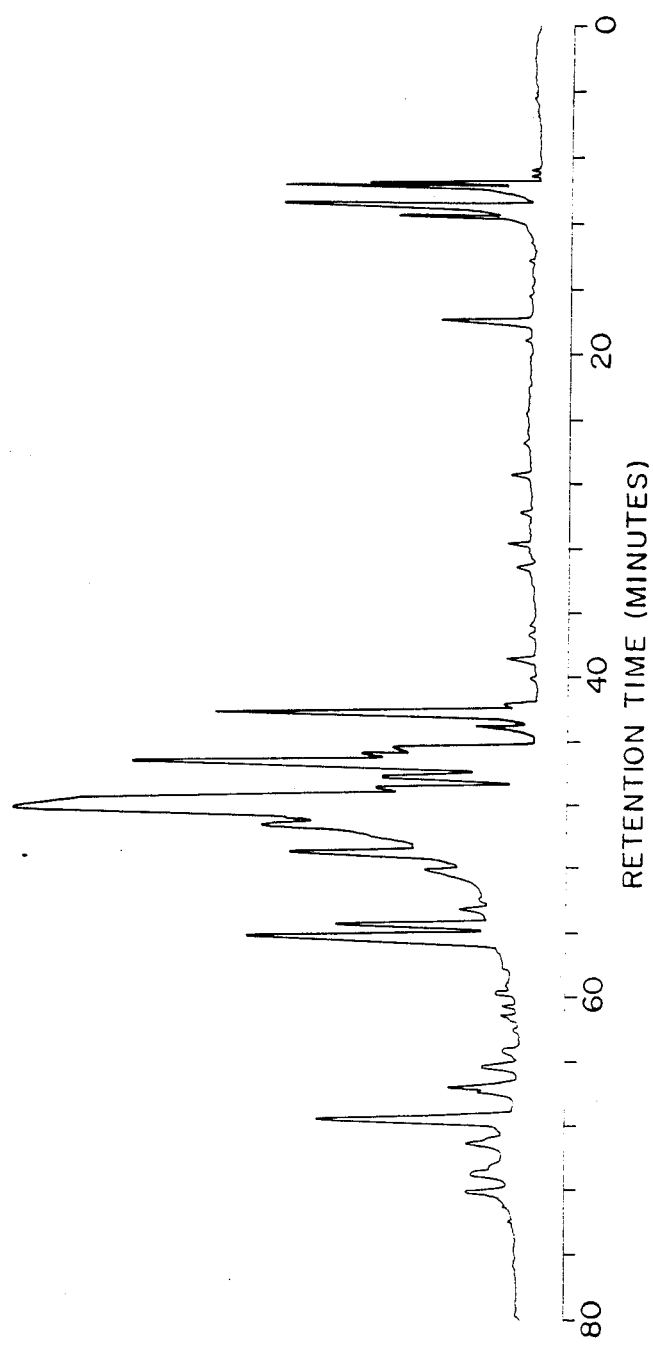
Figure 3:
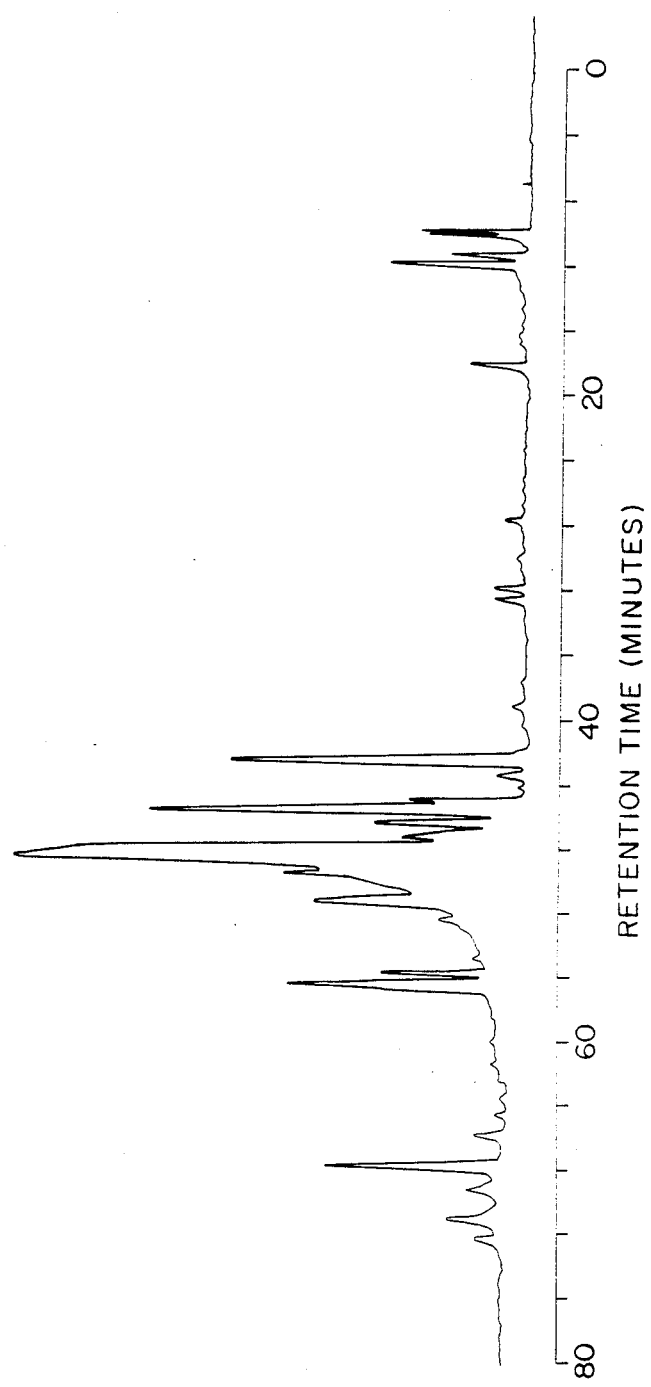
Figure 4:
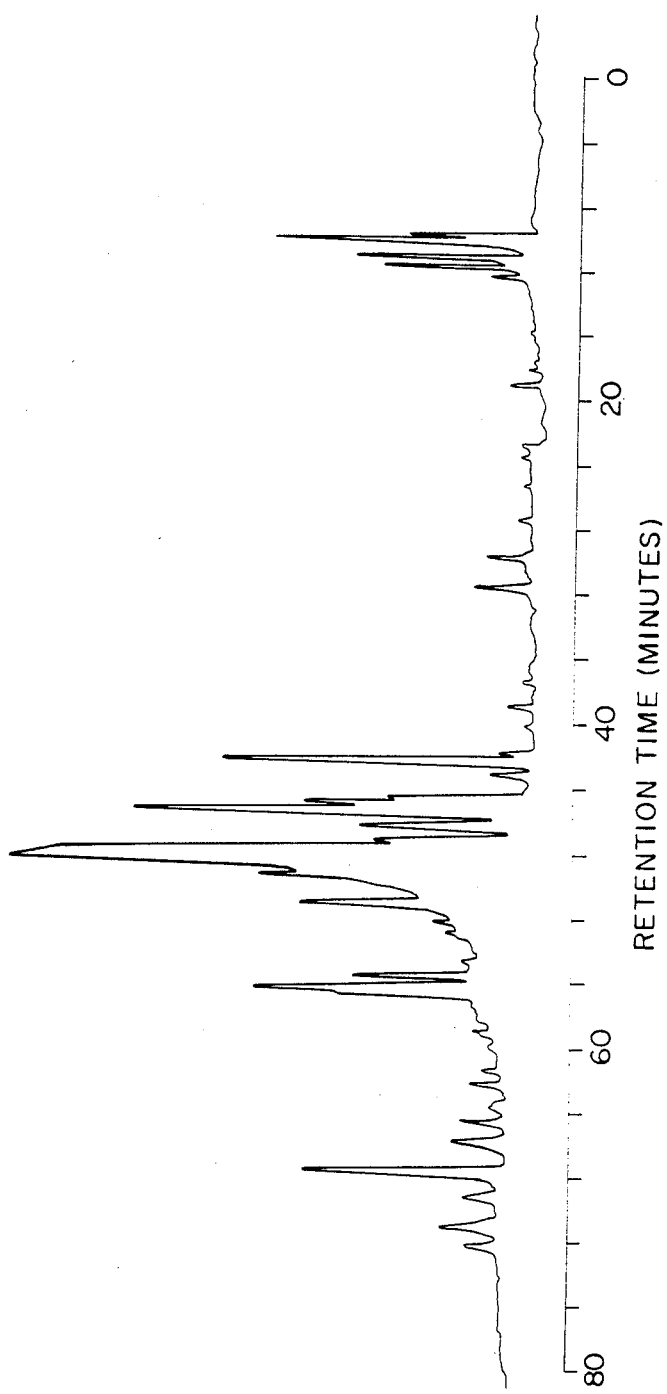

This invention provides a natural grapefruit juice concentrate made from grapefruit juice comprising a particulate solids portion and a serum portion. The serum portion comprises about 80% to 93% water and about 7% to 20% other compounds. These other compounds include both soluble and suspended solids, such as non-volatile and volatile aroma and flavor compounds. The volatile compounds can be divided into a lower boiling fraction and a higher boiling fraction. For grapefruit juice, the lower boiling fraction contains ethyl butyrate and other volatiles, and the higher boiling fraction contains limonene, among others. The natural grapefruit juice concentrate comprises: (1) at least 35% total solids comprising pulp, non-volatile and volatile flavor and aroma compounds, two of the volatile compounds being ethyl butyrate and limonene; (2) at least 0.1%, and preferably at least 0.15% of the volatile equilibrated headspace compounds being ethyl butyrate; (3) a proportion of the ethyl butyrate to the limonene being in the range of about 0.0015:1 to about 0.6:1. The amounts and proportions of the volatile compounds are direct equilibrated headspace integrator counts determined by gas chromatographic analysis of the headspace volatile compounds released from a sample at at temperature of 40° C. as described herein.

At least 65% of the volatile flavor and aroma compounds originally present in the grapefruit juice are present in the final fruit juice concentrate. This concentrate is made by a process comprising the following steps:

(1) Extracting juice from the grapefruit. The juice contains from about 7 to 20% particulate solids, from about 7 to 20% soluble and suspended solids, and the balance is water.

(2) Separating the juice into a particulate solids portion and a serum portion.

(3) Passing the serum portion to a concentrating zone in which essentially pure water in the form of vapor or ice crystals is removed. The concentration zone can be a freeze concentration zone or a sublimation concentration zone. In a freeze concentration zone, essentially pure ice crystals are formed and separated without removing substantial amounts of adhering solids. In a sublimation concentration zone, essentially pure water vapor is removed. Freeze concentration is capable of concentrating the starting material to a product containing from about 20% to about 52% solids, while sublimation concentration is capable of concentrating the starting material to a concentrate containing from about 20 to about 87% solids. A combination freeze concentration-sublimation concentration process can also be used.

(4) Removing a frozen concentrate product from the concentration zone. This concentrate, depending upon the process used to make it, contains from about 20% to about 87% solids and from about 13% to about 80% water.

Separating step (2) and concentrating step (3) must be performed under an inert atmosphere so as to avoid substantially any oxidative degradation of the solids in the juice or concentrate.

Processes such as those described in European Patent Application No. 833070493, published June 13, 1984 can also be used.

The grapefruit juice concentrate of the present invention is prepared from natural grapefruit juice. The juice comprises a particulate solids portion and a serum portion. The juice may be freshly squeezed, pasteurized juice, or frozen juice. As used herein, the particulate solids portion includes primarily pulp and can include the juice sacs, juice lipids, cellulose, hemi-cellulose, pectin and proteinaceous material. Some serum will always be present with the particulate solids portion since the particulate solids cannot be removed in completely dry form. Most of the chromatophores, the color bodies of the juice, are also found in the particulate solids portion.

The serum portion contains about 80 to about 93% water and from about 7 to about 20% other or non-aqueous compounds. The non-aqueous compounds of the serum include both soluble and suspended solids, including both non-volatile and volatile compounds.

The non-volatile compounds are primarily carbohydrates, carbohydrate derivatives, edible acids, enzymes, lipids, minerals, carotenes, vitamins, etc. The carbohydrates are primarily sucrose, fructose and glucose. The carbohydrate derivatives are materials such as pectin. The edible acids include citric acid, isocitric acid, ascorbic acid, malic acid, fumaric acid, oxalic acid, short chain fatty acids and various amino acids.

The volatile compounds are defined herein as those compounds which are swept from a fruit juice sample, such as a concentrate reconstituted to single strength juice (from 7 to 20% solids), when 50 ml. of nitrogen per minute are passed over the sample for 5 minutes at 40°, ±0.5° C., and the resulting volatiles are collected at liquid nitrogen temperatures. These volatiles are measured by gas chromatographic methods described herein.

The volatile compounds in the juice include a lower-boiling fraction, that is, the highly volatile portion, and a higher boiling fraction, which is less volatile.

In gas chromatography, the compounds in the lower-boiling fraction are eluted first from the capillary column described in detail hereinafter. For grapefruit juice, these compounds are characterized by having a boiling point less than 131° C. The low-boiling compounds include, but are not limited to, ethanol, acetaldehyde, methanol, butanol, hexanal, ethyl butyrate, etc..

The higher-boiling fraction is made up of those compounds which elute after the low-boiling compounds. In grapefruit juice, these compounds have a boiling point above 131° C. These compounds include, but are not limited to linalool, limonene, beta-pinene, alpha-pinene, myrcene, geranial, octanal, decanal, etc.

The ratio of the lower-boiling fraction to the higher-boiling fraction is determined by dividing the total gas chromatographic counts of the lower-boiling compounds by the total gas chromatographic counts of the higher-boiling compounds, excluding the counts attributable to limonene. Gas chromatographic counts are the automatically integrated peak areas of the gas chromatographic computing integrator. They are directly related to the concentration of each of the compounds present in the volatile mixture.

The ratio of ethyl butyrate to limonene is determined by the following fraction:

$$\frac{\text{ethyl butyrate G.C. counts}}{\text{limonene G.C. counts}}$$

"Substantially 100% of the non-volatile solids" means that at least 99% of these compounds are present in the concentrate in a form which is substantially unchanged.

"Substantially free of" means less than 1% of the compound is present in the concentrate.

DETAILED DESCRIPTION OF THE INVENTION

The grapefruit juice concentrate of this invention is made wholly from grapefruit. The sugar-to-acid ratio is closely associated with the edible quality of the fruit. The sugar-to-acid ratio is the ratio of total soluble solids to total acidity of the grapefruit juice. An immature fruit has a low sugar-to-acid ratio. As the fruit matures and approaches good eating quality, the sugar-to-acid ratio increases. A sugar-to-acid ratio of 8:1 to about 20:1 is considered acceptable. The preferred sugar-to-acid ratio herein is from 8.5:1 to 16:1, the most preferred range being 9.5:1 to 16:1.

In order to produce the superior natural grapefruit concentrate of this invention, the grapefruit juice must be processed with a minimum of exposure to oxygen and a minimum exposure to temperature above 0° C.

JUICING

In processing the grapefruit, they are first washed with a disinfecting solution, preferably a hypochlorite solution. The grapefruit are then thoroughly rinsed with water before subjecting them to juice extraction.

Juice extraction can be carried out by any of the available automatic juicing machines, or by hand squeezing the grapefruit. The type of equipment used to extract the juice is not critical. However, it is important to minimize extraction of peel oil in the juice extraction process. Peel oil contributes a bitter note to grapefruit juice, which may be undesirable. The peel oil content of the juice should be below 0.05%, and preferably between 0.005% and 0.03%. Peel oil concentration in the final product should not exceed 0.035%.

The peel oil is found in both the serum and the separated pulp. The pulp can adsorb peel oil and the concentration of peel oil in the pulp portion cap, at times, be greater than the concentration in the serum portion. The peel oil content of the pulp must be considered when calculating the peel oil content of the final concentrate.

Raw juice as it comes from the extractor or squeezing process contains pulp, rag and seeds. The rag and seeds are separated from the juice and pulp in a "finisher". The size of the screen in the finisher controls both the quantity and the size of the pulp left in the juice. The screen opening size can range from about 0.5 mm. to about 2.5 mm. When the screen opening is larger than 2.5 mm., small seeds can pass into the juice and contaminate it. This is preferably avoided. The resulting juice contains about 4% pulp to about 25% pulp, and from about 7% to about 20% soluble solids. The balance of the juice is water.

In order to maintain the quality and freshness of the juice, and to retain the aroma and flavor compounds, the grapefruit juice should be chilled immediately after extraction to a temperature below about 25° C., preferably below 5° C., after it is removed from the extractor and finisher.

SEPARATION

The juice is then preferably separated into a pulp (particulate solids) portion and a serum portion. A separator which gives a cleanly separated pulp portion and serum portion is preferred for the separation step. The only suspended solids the serum portion should contain should be of a particle size less than 80 microns. A high-speed centrifuge is preferred for this separation. The preferred centrifuge is a Westfalia centrifuge of the bowl-disc type which operates at speeds of from 8,000 to 9500 rpm. It is important that this separation be accomplished in the absence of oxygen. Therefore, the separation is performed under an inert atmosphere. The inert atmosphere can be provided by blanketing the separating unit with nitrogen or another non-reactive, non-oxidative gas such as helium or argon, or a hermetically sealed centrifuge can be used.

The pulp portion is separately stored in closed containers away from light, at temperatures below about 0° C. for later addition to the concentrated serum. This portion contains the pulp, suspended solids, and the solids which are soluble in, adsorbed to, or are associated with the pulp.

The serum portion comprises about 80 to 93% water and about 7 to 20% non-aqueous compounds which are soluble solids and suspended solids less than 80 microns in size. The soluble solids comprise both volatile and non-volatile compounds.

CONCENTRATION

In making the concentrate of this invention, the serum portion removed from the juice is concentrated at low temperatures. Freeze concentration or sublimation concentration is used. Freeze concentration is accomplished in a manner in which the water is removed as substantially or essentially pure ice crystals. Adhering solids or occluded solid compounds must not be present in the ice and must not be removed with the ice.

A highly preferred embodiment involves a freeze concentrator which has a scraped-wall heat exchanger connected to an adiabatic recrystallizer tank. The recrystallizer tank allows the ice crystals to recrystallize and the ice crystals to grow in size under conditions which form pure ice. A filter at the exit of the tank retains all crystals of more than 100 microns in size. This insures that most ice nuclei are retained for recrystallization. The recrystallized ice is separated from the concentrated juice by the use of a wash column. The wash column rinses any adhering concentrate from the ice crystals, and expedites removal of essentially pure ice from the freeze concentrate. A preferred apparatus for use in freeze concentration is the Grenco freeze concentration unit. This unit is described in U.S. Pat. No. 4,377,892, issued to Thijssen in 1973; U.S. Pat. No. 3,872,009, issued to Thijssen in 1975; and U.S. Pat. No. 4,004,896, issued to Thijssen et al. in 1977.

Sublimation concentration is an alternative concentration method and is equally suitable for making the concentrates of this invention. Sublimation concentration employs conventional freeze drying apparatus, and removes water as pure vapor. In sublimation concentration, the juice, which may or may not contain pulp, is frozen solid. Preferably, this will be done with agitation in a closed system under an inert atmosphere. The agitation causes the growth of large crystals. The juice/ice mixture is then cooled to −60° C., which brings about total freezing of the juice/ice mixture. The frozen juice is then ground and sieved. Particles ranging from 100 microns to 150 microns are used for the sublimation concentration.

As water is removed from the juice, the temperature must be carefully maintained to keep the frozen juice in the solid state. Otherwise, important volatile compounds could be lost.

If desired, water can be removed from the serum as essentially pure ice in a freeze concentration step, to increase the concentration of the juice to about 25% to 35% solids, and then this concentrate can be further concentrated by sublimation of essentially pure water vapor to a concentration of from about 40% to about 87% solids. Because the starting material for the sublimation concentration step is a concentrate, the surface temperature initially must not exceed about −30° C. to about −25° C., the eutectic temperature of the concentrate. A vacuum of less than 100 microns is used.

In any event, the pure water removal step, whether sublimation concentration, freeze concentration, or a combination of the two, must be performed under conditions which avoid substantially any oxidative degradation of the solids present in the serum. Thus, the freeze concentration system must be closed and the juice entering the concentrator should be held under a blanket of inert gas. The use of a closed system prevents loss of the low-boiling aroma and flavor compounds. The inert atmosphere prevents oxidation of the volatile and non-volatile compounds.

The concentrated serum resulting from sublimation concentration, freeze concentration or a combination of the two contains at least 35% solids and up to 87% solids. Substantially all the non-volatile compounds originally present in the soluble solids portion of the serum are in the resulting concentrate. Thus, at least 99% of the non-volatile compounds are retained. At least 65% of the volatile compounds originally present in the juice are also contained in the concentrated serum.

PULP

The concentrated serum is blended with from 30% to 100% of the pulp fraction to produce an orange juice concentrate having from about 5% to about 15% (V/V) pulp and 85 to 95% concentrated serum.

The size of the pulp affects the perception of the amount of pulp within the juice. An orange juice concentrate containing 10% of pulp of a 0.50 mm. size is perceived as having very little pulp compared to a juice having 10% pulp of 10 mm. average size. Thus, not only the amount but also the size of the pulp present is important in preparing a consumer-acceptable product. The pulp content and pulp size depend upon the method and manner of squeezing the juice, upon the finishing process, and like factors, as mentioned before. It has been found that a concentration of pulp in the range of from 5% to 19% (volume/volume) is an acceptable concentration in a grapefruit juice concentrate. The pulp percentage is measured by centrifuging the concentrate. The size of the pulp should be between 0.1 mm. and about 10 mm. Preferably, the amount of pulp will be 6% to 12% (V/V) having a size of 0.50 mm. to 5 mm.

PACKAGING

The juice concentrate is then packaged. To insure long-term oxidative stability, the packaging materials should be impermeable to oxygen. Optionally, the concentrate can be packed under nitrogen to minimize oxygen content of any container headspace.

The product is kept at a temperature of 0° C. or less during long-term storage. Preferably, it is held at a temperature of from −20° C. to −80° C.

VOLATILES

The natural grapefruit juice concentrate prepared by the process described above is unique in its retention of at least 65% of the volatile compounds originally present in the starting juice. Gas chromatographic analyses of the volatile portion of the serum indicates that there are at least 250 compounds, and probably considerably more, present in the volatile portion of the serum. Complete identification of these volatile compounds has not yet been achieved. These volatile compounds which are responsible for the aroma and flavor character of the concentrate are composed of alcohols, carbonyl compounds, acids, esters, terpenes, and other volatile hydrocarbons. The low-boiling fraction, as described above, contains large amounts of ethanol and acetaldehyde. Other key lower-boiling compounds are ethyl butyrate, methanol, butanol, hexanal, etc. The retention of the ethyl butyrate at a level of 0.1% and preferably above 0.15% of the volatile headspace compounds, that is, at least about 60% of the ethyl butyrate originally present in the juice, is unique to this invention. Ethyl butyrate is partially responsible for the fruity character of grapefruit juice. Its presence alone, even with ethanol, acetaldehyde and hexanal, does not produce the entire grapefruit aroma and flavor. Some key compounds in grapefruit juice aroma and flavor, such as the thiol of alpha-terpineol, are perceptible at the fractional parts-per-trillion level, and thus are not readily detectable by conventional analytical techniques. Nevertheless, retention of ethyl butyrate, along with the retention of at least 65% of the total volatile compounds, is indicative of the retention of compounds which are present even in very minute amounts.

The higher boiling fraction, those compounds with boiling points about 131° C., contains limonene, alpha-pinene, beta-pinene, myrcene, and geranial, and other lesser volatile compounds. Limonene, at lower levels, is an important constituent of the flavor and aroma of grapefruit juice. The amount of limonene which should be present in the juice concentrate is from about 40% to about 98% of the total volatile compounds in the concentrate. More highly preferred compositions are those which contain from about 50% to about 80% limonene.

The proportion of ethyl butyrate to limonene should be in the range of from about 0.0015:1 to about 0.6:1. Preferably, this ratio will be in the range of 0.004:1 to 0.4:1. This ratio represents a preferred aroma and flavor composition.

The ratio of the lower-boiling fraction to the higher-boiling fraction should be at least 1.5:1. This ratio may be as high as 17:1. The preferred compositions herein have a low-boiling fraction to high-boiling fraction ratio in the range of 3:1 to about 12:1. As noted above, the limonene concentration is not used in the calculation of the gas chromatographic counts of the high-boiling fraction for the purpose of defining this ratio.

OTHER PROCESSING

While optional, a pasteurization step is important for maintaining the storage stability of the orange juice concentrate of this invention. Pasteurization controls the concentration of the bacteria and microbes so that the product does not deteriorate on storage, or does not deteriorate when reconstituted after a reasonable period of time.

Pasteurization also reduces the activity of pectin esterase. Pectin esterase is the enzyme believed to be responsible for demethylating the pectin in the juice and thus destroying the cloud of the juice. This enzyme is somewhat active even at 0° C. Thus, if a cloudy juice is desired, the compositions herein will preferably contain a minimal level of pectin esterase enzyme. An activity level below 1.5 $(PE)_U \times 10^4$, preferably an activity of below 0.5 $(PE)_U \times 10^4$, is achieved by pasteurization of the juice. Alternatively, where a clarified juice or concentrate is desired, this enzyme can be activated and permitted to operate on the pectin in the juice.

A high temperature, short residence pasteurization technique is preferable in pasteurizing the product. The juice, pulp or concentrate is heated to a temperature of from about 80° C. to about 95° C. for about 3 to about 12 seconds. The juice or concentrate is then rapidly cooled to a temperature of about 5° C. to about −10° C., respectively. The system used to pasteurize the juice must be closed and the pasteurization must be conducted in such a manner that the juice is not exposed to an oxidative atmosphere.

USE

The concentrate of this invention can be reconstituted by dilution with water to prepare a single-strength juice beverage. A 41.8% to 44.8% solids concentrate is diluted with three parts of water to one part concentrate. A 73.2% to 78.4% concentrate is diluted with six parts of water to one part of concentrate. If carbonated water is used to dilute the concentrate, a carbonated beverage can be formed.

The concentrated serum, with or without the added pulp, can also be used as a flavorant in beverages, baked goods, culinary mixes, candies, frostings, salad dressings and other food products.

ANALYTICAL PROCEDURES

1. Determination of pulp level

The pulp level is determined according to the USDA standards as approved by the Florida Citrus Code, Part 16. The pulp is determined by centrifuging the juice at a centrifugal force of 367.3 g's for ten minutes. The percent of pulp is then calculated on a volume-to-volume (V/V) basis.

2. Gas Chromatographic Analysis Method

A cylindrical glass vessel 15.2 cm. high, 7.52 cm. diameter having a total volume of 350 ml. is used. The glass vessel is closed with a glass cap fitting onto the vessel with an O-ring. The vessel cap has one inlet pipe reaching 15 cm. into the glass vessel but not below the surface of the liquid, and one outlet pipe. Both of these pipes are made of ¼ inch tubing.

Ten ml. of the sample juice is placed into the glass vessel. The sweeping vessel is equipped with a Teflon-coated stirring bar (3×1 cm.) to keep the sample thoroughly mixed during the sweeping period. Fifty ml. of nitrogen/minute for five minutes is used for sweeping. During this time, the vessel is submerged in a constant temperature bath at 40° C.±0.5° C. The headspace aroma mixture is then swept from the vessel and collected in glass-lined stainless steel condensing tubing three inches long by ⅛ inch in outside diameter, filled with glass beads (80 to 100 mesh, Anaport #GCS-022).

The tubing is connected to a Perkin-Elmer Model No. 990 Gas Chromatograph. The gas chromatograph is equipped with a sniff-port, a flame ionization detector, and a sulfur detector. The effluent is divided among these ports in the ratio of 3:1:1, respectively. Manifold temperature is about 195° C. The attenuation setting on the flame ionization detector is "2", and the range is set at "1". The peaks resulting from the eluting compounds are measured using a Spectra Physics, Inc. Autolab System 1 Computing Integrator. The recorder is a Hewlett-Packard Model 3138A two-point recorder. The gas chromatographic temperature profile is programmed as follows: oven temperature at 25° C. for 12 minutes, a 3° C. per minute increase for 51.666 minutes, then isothermal at 180° C. for an additional 16 minutes.

This method was used to obtain gas chromatographs of a grapefruit concentrate prepared by the method of this invention as in Example 1 (Table 1), a commercial, conventionally prepared juice (Table 2), and a mechanically squeezed grapefruit juice (Table 3). Some of the representative compounds are identified for each chromatogram. The compounds were identified by retention time of known standards, combination of gas chromatography with mass spectroscopy, and treatment of the juices with esterase.

The integrator's recorder output was set for a logarithmic response. The instrument automatically integrated the peak areas.

As the tables indicate, the grapefruit juice concentrate prepared by the process of this invention (Table 1) retained 89% of the ethyl butyrate present in the mechanically squeezed juice (Table 3). The conventionally processed juice contained only trace amounts of ethyl butyrate. The process of this invention also allowed retention of 88% of the total volatiles present in the fresh juice.

TABLE 1

(grapefruit juice concentrate prepared as in Example I after dilution to single strength)

| Compound | Retention Time (min.) | Area (%) | Area (counts) |
|---|---|---|---|
| Acetaldehyde | 12.78 | 1.447 | 45,824 |
| Methanol | 13.12 | 2.757 | 87,330 |
| Ethanol | 14.38 | 30.948 | 980,215 |
|  | 20.43 | 1.010 | 31,990 |
|  | 21.48 | .127 | 4,033 |
| Hexanal | 33.23 | .095 | 3,013 |
| Ethyl butyrate | 33.83 | .135 | 4,260 |
| Alpha-pinene, beta-pinene | 43.20 | .249 | 7,893 |
| Myrcene | 46.02 | 1.265 | 40,063 |
| Limonene | 48.48 | 58.453 | 1,851,337 |
|  | 49.67 | .708 | 22,431 |
|  | 50.53 | .036 | 1,144 |
|  | 56.65 | .046 | 1,454 |
|  | 68.03 | 2.584 | 81,845 |
|  | 69.63 | .069 | 2,176 |
|  | 69.68 | .071 | 2,240 |
| Total GC Counts: 3,167,248 | | | |

TABLE 2

(commercial, conventionally prepared juice)

| Compound | Retention Time (min.) | Area (%) | Area (counts) |
|---|---|---|---|
| Acetaldehyde | 12.78 | 0.115 | 8362 |
| Methanol | 13.18 | 0.147 | 10,646 |
| Ethanol | 14.37 | 2.094 | 151,905 |
|  | 15.43 | 0.048 | 3516 |
|  | 20.48 | 0.077 | 5583 |
| Hexanal | 33.27 | 0.029 | 2092 |
| Alpha-pinene, beta-pinene | 43.22 | 0.429 | 31,135 |
|  | 45.23 | 0.046 | 3306 |
| Myrcene | 46.05 | 2.271 | 164,814 |
|  | 46.77 | 0.019 | 1402 |
|  | 46.88 | 0.021 | 1494 |
|  | 46.98 | 0.041 | 2941 |
|  | 47.43 | 0.031 | 2243 |
| Limonene | 48.73 | 90.861 | 6,592,843 |
|  | 49.40 | 3.228 | 234,206 |
|  | 51.47 | 0.094 | 6808 |
|  | 51.77 | 0.051 | 3733 |
|  | 56.62 | 0.134 | 9721 |
|  | 67.93 | 0.265 | 19,208 |
| Total counts = 7,255,958 | | | |

TABLE 3

(Mechanically extracted grapefruit juice, no concentration step)

| Compound | Retention Time (min.) | Area (%) | Area (counts) |
|---|---|---|---|
| Acetaldehyde | 12.18 | .160 | 5,766 |
| Methanol | 12.55 | 1.273 | 45,907 |
|  | 12.95 | 1.888 | 68,091 |
|  | 13.72 | 2.484 | 89,600 |
| Ethanol | 14.20 | 20.279 | 731,568 |
|  | 15.13 | .092 | 3,323 |
|  | 19.97 | .174 | 6,270 |
|  | 20.23 | .533 | 19,216 |
| Hexanal | 33.17 | .069 | 2,484 |
| Ethyl butyrate | 33.75 | .152 | 5,466 |
|  | 41.48 | .081 | 2,937 |
| Alpha-pinene, beta-pinene | 43.17 | .268 | 9,654 |
|  | 45.23 | .080 | 2,902 |
| Myrcene | 46.00 | 1.540 | 55,563 |
| Limonene | 48.48 | 68.142 | 2,458,179 |
|  | 49.47 | .511 | 18,443 |
|  | 49.70 | .429 | 15,471 |
|  | 56.62 | .030 | 1,085 |
|  | 67.95 | 1.817 | 65,536 |
| Total GC Counts: 3,607,461 | | | |

3. Gas Chromatographic Analysis—Method 2

Figure 5:
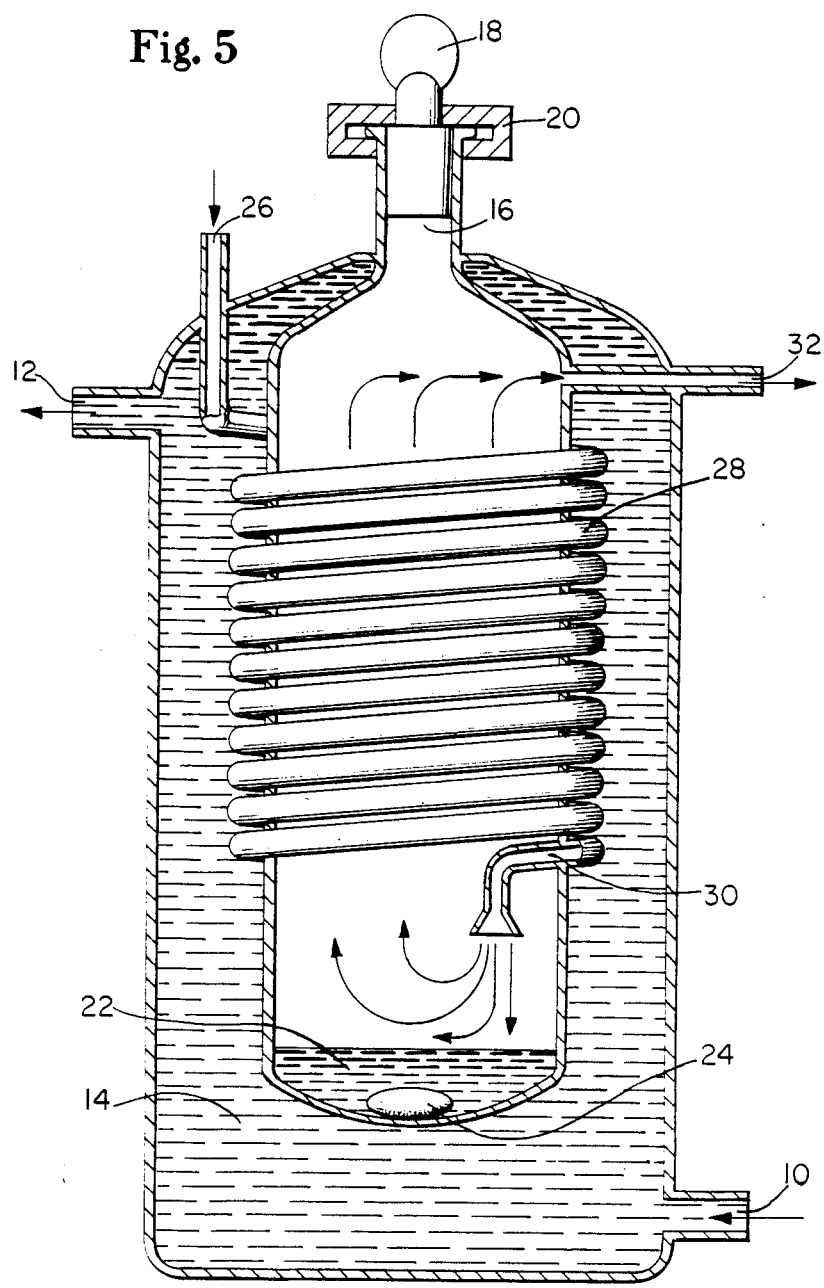
FIG. 5 illustrates a headspace sweep flask/equilibration vessel of the type used in gas chromatographic analysis herein.

This method differs only slightly from the preceding method, but provides very low standard deviations from measurement to measurement. The sweep flask used is illustrated in the drawing (FIG. 5). It consists of a double walled cylindrical glass flask providing an inner, sample chamber, an outer water bath chamber 14, and a temperature equilibration coil 30 for the sweep gas. The outer water bath chamber consists of glass tubing 100 mm in diameter and 200 mm high. The inner sample chamber consists of glass tubing 60 mm in diameter and 170 mm high to the bottom of the neck reaching beyond the water bath chamber.

The inlet 10 and outlet 12 tubings of the water bath chamber are made of glass tubing to fit #5 O-ring joint.

The inlet tubing 26 and the outlet tubing 32 for the inner sample chamber is made of ¼-inch×2 mm ID capillary tubing. The temperature equilibration coil 30 is made from ¼-inch medium wall tubing. It is wound around the inner sample chamber in such a fashion to maintain a distance of ~2 mm from the inner sample chamber. The exit of the temperature equilibration coil is placed in an offset position from the center of the inner sample chamber. The exit of the temperature equilibration coil is funnel-shaped.

The distance from the liquid sample surface to the funnel-shaped exit of the temperature equilibration coil is about 25 mm.

The neck of the inner sample chamber consists of a 14/20 standard taper ground glass joint. It is closed off by a 14/20 standard taper ground glass stopper 18. The stopper is held in place by a plastic clip 20. The outer wall of the flask has an inlet 10 and an outlet 12 used for introduction and withdrawal of water at 40° C. for the constant temperature bath. A sample is introduced into the inner flask by removing clip 20 and stopper 18. Before introducing a sample, the inner flask including the transfer line is flushed thoroughly with nitrogen. This is done by attaching a nitrogen source to port 26. A football-shaped magnetic stirring bar 24, having dimensions of 1 cm. (dia.)×2.5 cm. (length), is added to the sample to provide agitation during sweeping.

The gas chromatograph is fitted with a Valco Model C-10 TNG heated ten port valve. It is also fitted with a trap consisting of 0.142 grams 40/60 mesh untreated glass beads (Anaport No. GCS-020, Lot No. 81-9) held in place with glass wool plugs inside a 7.62 cm. (3 inch)×0.3175 cm. (⅛ inch) OD glass-lined stainless steel tubing wrapped with heater wire and mounted in a bored-out polytetrafluoroethylene block. This trap is located inside of the column oven, and the heater wire is connected to a variac set at 60 volts which is connected to a thermostat set to maintain a trap temperature of 200° C. In addition, the polytetrafluoroethylene block containing the trap is also bored to provide a liquid nitrogen jacket surrounding the trap. This jacket is connected via 0.635 cm. (¼ inch) copper tubing and a solenoid valve to a source of liquid $N_2$ at 8 psig. A second 0.635 cm. (¼ inch) copper tubing vents $N_2$ vapors produced in the liquid $N_2$ jacket to the outside of the oven. By this arrangement of heating and cooling devices, and by manipulation of the ten port valve, the trap can be cooled to liquid nitrogen temperatures ($-180°$ C.) to collect volatiles swept from the equilibration chamber/sweep flask, and then heated to about 200° C. while the sweep flask is isolated from the trap and a carrier gas is directed through the trap to remove condensed volatiles for analysis by the gas chromatograph.

Normally, carrier gas flow is directed through the trap to the gas chromatograph column, while the sweep gas flow is blocked off and the equilibration chamber/sweep flask is vented to the atmosphere. During a headspace sweep volatile collection, carrier gas is routed directly through to the column while sweep gas is directed through the equilibration chamber/sweep flask, through a heated (200° C.) transfer line, to the trap ($-180°$ C.) where the swept volatiles are condensed out, and out the vent. Sweep gas volumes are monitored by volumetric displacement of water.

The Perkin-Elmer 990 gas chromatograph is equipped with a sniff port, a flame ionization detector and a Tracor Model FPD-100-AT flame photometric detector set up for sulfur detection. A Spectra-Physics, Inc. Autolab System 1 computing integrator is connected to the gas chromatograph and the ten port valve through an appropriate electronic interface. The timing function of the integrator is used as follows:

T4—start trap cooling with liquid nitrogen and begin heating transfer line to 200° C.

T-5—begin sweep gas flow through equilibration chamber/sweep flask (ten port valve energized).

T-6—end sweep gas flow through equilibration chamber/sweep flask; turn transfer line heater off; turn trap liquid nitrogen cooling off and trap heater on; initiate gas chromatograph temperature programming; start chart recorder drive.

T-7—turn trap heater off.

The output of the flame ionization detector is connected through the Autolab System 1 integrator to one channel of a Hewlett-Packard Model 7128A two pen recorder. The output of the flame photometric detector is connected directly through its electrometer to the other channel of the recorder. The effluent from the trap is divided among the sniff-port and two detectors in the ratio of 3:1:1, respectively. The injection temperature and manifold temperature are both 180° C. The flame ionization detector is set to an attenuation of 2 and a range of 1. The $H_2$ flow regulator is set to 18 psig and the air flow regulator is set to 57 psig. The column carrier flow is set to 1.0 on the rotometer, which corresponds to about 8 to 10 ml. $N_2$/min. at 25° C.

The flame photometric sulfur detector is set to an $H_2$ flow of 180 on the rotometer and an air flow of 40 on the rotometer. $O_2$ flow is set to 15. The bucking range is set to $-2\times10^{-6}$. Input attenuation is set to $10^3$ and output attenuation is set to 16. The polarity is set to positive. On the recorder, the pen sensitivity of the sulfur detector is set to 0.2 millivolts and the chart speed is set to 0.635 cm. (¼ inch) per minute. The integrator settings are as follows:

T4—60

T5—290

T6—530

T7—730

Minimum area—500.

Set No. (1)—PW=7; SS=40; FP=0; BL=5; TP=40; T1=1,010 (8 min.).

Set No. (2)—PW=10; SS=40; FP=0; BL=3; TP=0; T1=1850 (22 min.).

Set No. (3) PW=15; SS=120; FP=4; BL=3; TP=30; T1=3410 (48 min.).

All other values are set at "default values" for the integrator.

The column oven is programmed as follows: 20° C. for 12 minutes, followed by an increase of 3° C. per minute to 180° C., followed by holding at 180° C. for 16 minutes.

In the analytical method, a frozen sample of single strength juice, or concentrate, diluted to single strength before freezing, of approximately 12 ml. volume contained in a 16 ml glass vial, called a "4 dram glass vial" is placed in a 25° C. water bath to thaw for 30 minutes. The vial is inverted by hand 20 times and placed on a Vortex Model K-500-J mixer for 15 seconds. Ten ml. of this sample is measured using a calibrated graduate cylinder and is poured into the inner chamber of the sweep flask through the top of opening 16. The stopper 18 is inserted and the retaining clip 20 is applied. The sample is allowed to equilibrate for 610 seconds before initiating a run. With T5 of the integrator set at 290, as provided above, this provides a total time of 15 minutes of equilibration before the start of the sweep. When the sweep has begun, nitrogen flows at 50 ml. per minute into inlet 26 and through temperature equilibration coil 28, which shares the same water bath 14 as the sample 22, so that both gas and sample are at the same temperature when the sweep occurs. The inlet pipe 30 to the inner flask is positioned off-center to provide for thorough sweeping of the headspace of the sample 22. The pounds were identified and measured quantitatively. Results of these samples were as follows:

TABLE 4

|   | ethyl butyrate counts | ethyl butyrate % of total | low boiler total counts | limonene counts | high boiler - limonene total counts | low boiler to high boiler ratio | ethyl butyrate to limonene ratio |
|---|---|---|---|---|---|---|---|
| A | NI | <0.00246 | 47,974 | 19,139,325 | 1,176,325 | 0.0408 | <0.0000261 |
| B | 2089 | 0.01740 | 297,995 | 11,011,067 | 698,548 | 0.4266 | 0.0001897 |
| C | NI | <0.00289 | 47,684 | 16,196,802 | 1,023,679 | 0.0466 | <0.0000308 |
| D | 1371 | 0.01155 | 27,285 | 11,215,025 | 626,910 | 0.0435 | 0.0001222 |
| E | NI | <0.00335 | 52,654 | 14,040,558 | 818,359 | 0.0643 | <0.0000355 |
| F | 2416 | 0.01969 | 281,122 | 11,316,658 | 672,320 | 0.4181 | 0.0002135 |
| G | NI | <0.00446 | 170,573 | 10,567,418 | 461,883 | 0.3693 | <0.0000472 |
| H | 524 | <0.00329 | 81,664 | 14,959,843 | 908,995 | 0.0898 | <0.0000350 |
| I | NI | <0.00453 | 61,596 | 10,455,408 | 503,428 | 0.1224 | <0.0000477 |
| J | 601 | 0.00589 | 106,020 | 9,636,620 | 459,296 | 0.2308 | 0.0000624 |
| K | NI | <0.00245 | 56,624 | 19,122,396 | 1,156,046 | 0.0490 | <0.0000261 |
| L | 1972 | 0.01120 | 26,105 | 16,538,173 | 1,042.130 | 0.0250 | 0.0001192 |
| M | NI | <0.00251 | 29,239 | 18,698,287 | 1,153,206 | 0.0254 | <0.0000267 |
| N | 2385 | 0.01896 | 322,658 | 11,668,981 | 587,932 | 0.5488 | 0.0002044 |
| O | NI | <0.00365 | 54,881 | 12,857,926 | 762,476 | 0.072 | <0.0000388 |
| P | 524 | 0.00371 | 485,176 | 12,983,966 | 668,744 | 0.7255 | 0.0000404 |
| Q | NI | <0.00274 | 12,065 | 17,069,251 | 1,157,456 | 0.0104 | <0.0000292 |
| R | 984 | 0.00741 | 17,718 | 12,690,088 | 579,285 | 0.0306 | 0.0000775 |
| S | 574 | 0.00512 | 25,393 | 10,638,017 | 558,256 | 0.0455 | 0.0000540 |
| T | 633 | 0.00432 | 84,848 | 13,766,110 | 814,560 | 0.1042 | 0.0000460 |
| U | NI | <0.00348 | 46,336 | 13,514,647 | 795,244 | 0.0583 | <0.0000369 |
| V | NI | <0.00445 | 54,609 | 10,658,302 | 533,601 | 0.1023 | <0.0000469 |
| W | NI | <0.00372 | 31,931 | 12,720,288 | 657,842 | 0.0485 | <0.0000392 |
| X | NI | <0.00436 | 20,991 | 10,898,864 | 532,132 | 0.0394 | <0.0000458 |
| Y | NI | <0.00267 | 60,562 | 17,674,765 | 979,962 | 0.0618 | <0.0000282 |
| Z | NI | <0.00418 | 6,198 | 11,362,858 | 574,312 | 0.0108 | <0.0000440 |
| AA | 16,858 | 0.11490 | 123,552 | 13,719,050 | 829,280 | 0.1490 | 1.0012288 |
| AA | NI | <0.00422 | 163,422 | 11,119,586 | 542,304 | 0.3014 | <0.0000449 |
| AA | 530 | 0.00408 | 113,676 | 12,254,006 | 615,490 | 0.1847 | 0.0000433 |
| AA | 615 | <0.00654 | 165,952 | 8,835,735 | 404,586 | 0.4102 | <0.0000696 |
| AA | NI | <0.00427 | 84,351 | 11,066,900 | 552,494 | 0.1527 | <0.0000452 |
| AA | NI | <0.00407 | 186,347 | 11,518,014 | 585,220 | 0.3184 | <0.0000434 |

NI - not integrated

TABLE 5

| | | | Concentrate according to Example 1 | | | | |
|---|---|---|---|---|---|---|---|
| | ethyl butyrate counts | ethyl-butyrate % of total | total low boiler counts | limonene counts | total high boiler limonene counts | total low boiler to high boiler ratio | ethyl-butyrate to limonene ratio |
| | 9,819 | 0.18936 | 1,778,202 | 3,036,831 | 370,359 | 4.8013 | 0.0032333 |
| | 10,091 | 0.19393 | 1,768,640 | 3,082,575 | 352,189 | 5.0218 | 0.0032736 |
| | 9,961 | 0.18080 | 1,856,579 | 3,280,883 | 372,043 | 4.9902 | 0.0030361 |
| | 10,341 | 0.17509 | 1,923,995 | 3,595,314 | 386,659 | 4.9759 | 0.0028762 |
| | 10,668 | 0.18221 | 1,935,118 | 3,543,144 | 376,633 | 5.1379 | 0.0030109 |
| | 10,976 | 0.18560 | 1,938,967 | 3,580,588 | 394,358 | 4.9168 | 0.0030654 |
| | 10,624 | 0.18122 | 1,950,219 | 3,491,965 | 420,230 | 4.6408 | 0.0003042 |
| | 10,735 | 0.16947 | 2,052,092 | 3,845,152 | 437,140 | 4.6944 | 0.0027918 |
| | 9,649 | 0.17232 | 1,924,352 | 3,314,711 | 360,306 | 5.3409 | 0.0029110 |
| | 10,234 | 0.18408 | 2,004,263 | 3,218,123 | 337,069 | 5.9462 | 0.0031801 |
| | 9,491 | 0.17245 | 1,814,922 | 3,326,487 | 362,288 | 5.0096 | 0.0028532 |
| | 9,778 | 0.16875 | 2,045,355 | 3,343,136 | 405,896 | 5.0391 | 0.0029248 |
| MEANS | 10,197 | 0.17961 | 1,916,059 | 3,388,242 | 381,264 | 5.0429 | 0.0030165 |
| STD. DEV. | ±477 | ±0.00805 | ±95,200 | ±231,995 | ±29,031 | ±0.3411 | ±0.0001537 |
| % STD. DEV. | ±4.7% | ±4.6% | ±5.0% | ±6.8% | ±7.6% | ±6.8% | ±5.1% | entire equilibration chamber/sweep flask apparatus sits on a Fisher Jumbo Magnetic Stirrer at setting "3" to provide constant agitation of the sample. The sweep gas flows through the headspace of the sample 22 and out of the sweep flask through outlet 32 to the transfer line to the gas chromatograph.

This method was used to obtain gas chromatographs of a number of samples of commercial, conventionally prepared grapefruit juice concentrates and of the concentrate prepared according to example 1. Certain com- 4. Identification of Ethyl Butyrate The boiling points of hexanal and ethyl butyrate are close. Hexanal and ethyl butyrate are eluted from the columns at or about the same time. Therefore, the presence of ethyl butyrate in the composition can be determined by the following test procedure. Ten ml. of a grapefruit juice concentrate (44.8% solids) is diluted with water (3 parts of water per 1 part of concentrate is used). The pH is adjusted to 8 using 1N sodium hydroxide. Three drops of an esterase solution (Sigma E-3128, lot 68C-8135, 8 mg. of protein/ml. 120 units/mg. protein) are added to the alkaline grapefruit juice. The solution is incubated for 30 minutes at 24° C. in the sampling vessel. The gas chromatographic analysis method 1 is used (capillary column coated with SF-96, diameter 0.03" i.d., 500' long, Perkin Elmer 990 gas chromatograph) to measure the volatile compounds present.

The peak in the chromatogram which has been tentatively identified as ethyl butyrate is absent after treatment with this esterase solution. This peak has a retention time of approximately 30.5 minutes. The disappearance of the ethyl butyrate after esterase treatment is also confirmed using gas chromatography-mass spectroscopy combinations.

EXAMPLE 1

Grapefruit of an average diameter of 4½ inches were washed in a solution containing 100 ppm. of hypochlorite. The grapefruit were rinsed with fresh tap water and passed into a juice extractor. An Automatic Machinery Equipment extractor, Model No. 700, which slices the grapefruit in half and then squeezes each half, was used. The gap setting between the reamer and holding cups was 3/16 inch.

A finisher using a 0.05 cm. screen was used to separate the rag and seed from the juice.

The juice contained 9.6% solids (non-aqueous compounds) and 0.003% peel oil.

The juice was then filled into 5-gallon plastic pails and frozen at 0° F. for one week. The containers were then shipped to the processing site and carefully thawed to keep the grapefruit juice temperature below 60° F.

At this point, grapefruit juice contained 9.4% solids (non-aqueous compounds) and 0.003% peel oil.

A Crepaco pasteurizer unit was used to pasteurize the juice. The pasteurizer is a closed system consisting of three swept surface heat exchangers. The first uses 30 psi steam at about 120° C. to heat the serum to about 88° C. for 7 seconds. The heated serum then passes through consecutive swept surface heat exchangers at about 4° C. to rapidly cool the juice. The bacteria analysis of the juice showed a total bacteria plate count of less than 250. The peel oil content was about 0.003%.

The pulp was separated from the juice first by passage through a 30-mesh screen, vibrating separator. Then further pulp removal and serum clarification was done by use of a bowl-type centrifuge (Westfalia Corp., Model No. SB-7-06-576) operating at a speed of 9500 rpm. The centrifuge bowl was blanketed with nitrogen during the separation.

The separated serum was pumped into a refrigerated supply tank held at 0° C. and equipped with a 90 micron filter at the exit. The tank was shielded from the light. A nitrogen gas blanket was continually maintained in the supply tank. The tank was periodically agitated.

The pulp ranged in size from 0.1 mm. to 5 mm. The pulp was stored away from the light at −40° C.

A Grenco freeze concentration unit, Model W8, was fed from the refrigerated supply tank. The Grenco system is a closed system.

The refrigeration unit and recirculation pump circulating the serum from the recrystallizer through the scraped wall heat exchanger were started and the juice was cooled down to −2° C. Cooling down the juice to −2° C. and formation of recrystallized ice was achieved after 5.1 hours, at which point the removal of ice via the wash column was started. After removal of the ice from the unit, the juice concentration increased steadily to reach a concentration of 49.5% after a 31 hour period. As ice was removed from the concentration unit, an equivalent quantity of fresh serum was pumped into the freeze concentrator. After 49.5% concentration was reached, the temperature of the recrystallizer fell to approximately −9.5° C. At this point, the concentrated serum was removed. The concentrated serum was stored at −40° C. until mixed with the pulp at the end of the experiment. The duration of this particular experiment was 38 hours. Approximately 12.0 kilograms of ice were removed per hour after reaching 49% concentration. A total of 33.2 liters of 48.7% concentrated grapefruit serum was produced. Approximately 800 liters of grapefruit serum were required for the production of the concentrate.

The concentrated serum was then blended with approximately a 10% level of pulp (V/V) which had been removed from the juice before the freeze concentration step.

After blending of the pulp with the concentrated juice, the mixture was then filled into 6-ounce zip-lock cans and stored at −20° C. until testing. The concentration of the final product was 43.6% solids.

The concentrate prepared by the above method was taste tested in paired comparison tests by randomly selected panelists. The reconstituted concentrate was preferred by from 59% to 90% of the panelists when compared to commercially available, conventionally processed juices.

What is claimed is:

1. A natural grapefruit juice concentrate prepared from grapefruit juice, comprising:
   (1) at least 35% total solids, comprising pulp, non-volatile compounds, and volatile compounds, the balance being water;
   (2) two of the volatile compounds being ethyl butyrate and limonene;
   (3) at least 0.10% of the volatile compounds being ethyl butyrate;
   (4) a proportion of the ethyl butyrate to the limonene being in the range of from about 0.0005:1 to about 0.6:1;
   (5) said volatile compounds comprising a low boiling and a high boiling fraction, wherein the ratio of the low boiling to high boiling fraction is at least 1.5:1, the amounts in proportions of the volatile compounds being determined by a gas chromatographic analysis of the headspace volatile compounds released from a equilibrated sample of single strength grapefruit juice made from the concentrate at a temperature of 40° C.

2. A concentrate according to claim 1 wherein at least 0.10% of the volatile compounds are ethyl butyrate and the proportion of the ethyl butyrate to the limonene is in the range of from about 0.0021:1 to about 0.6:1.

3. A concentrate according to claim 2 wherein the volatile compounds are at least 65% of the volatile compounds originally present in the juice.

4. A concentrate according to claim 3 wherein the total solids content is from about 40% to about 87%.

5. A concentrate according to claim 4 wherein the volatile compounds are from about 75% to about 95% of the volatile compounds originally present in the juice.

6. A concentrate according to claim 4 wherein the proportion of ethyl butyrate to limonene is from about 0.004:1 to about 0.5:1.

7. A concentrate according to claim 4 wherein the concentration of ethyl butyrate is at least 0.4%.

8. A concentrate according to claim 6 wherein a sugar-to-acid ratio is from 8.5:1 to 16:1.

9. A concentrate according to claim 1 having a pulp content of from 5% to 19% by volume (V/V).

10. A concentrate according to claim 8 wherein the ratio of low boiling to high boiling volatiles is from about 3:1 to about 12:1.

* * * * *